T. G. PLANT.
IRONING AND DRESSING JACK FOR BOOTS AND SHOES.
APPLICATION FILED OCT. 19, 1909.
958,287.  Patented May 17, 1910.
3 SHEETS—SHEET 2.
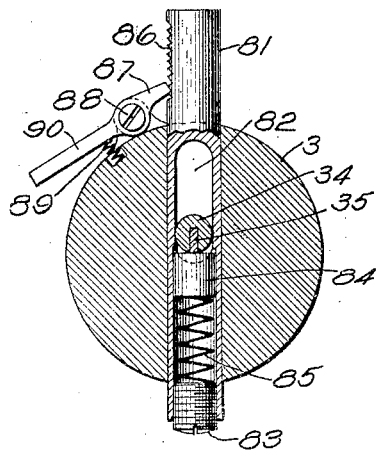
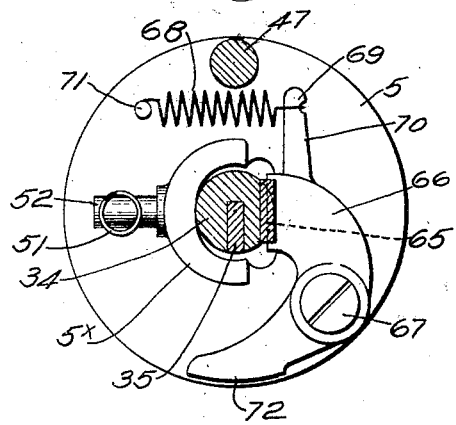
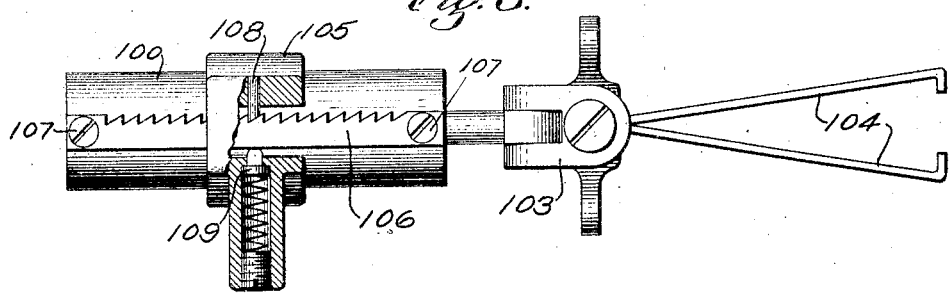
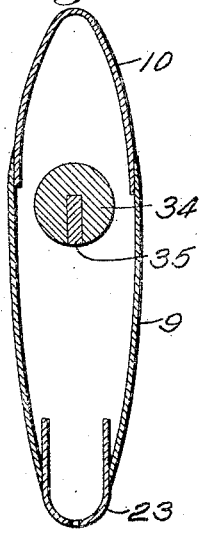
Witnesses:
Roswell F. Hatch
Redfield H. Allen
Inventor
Thomas G. Plant
by Robt. P. Harris
Attorney

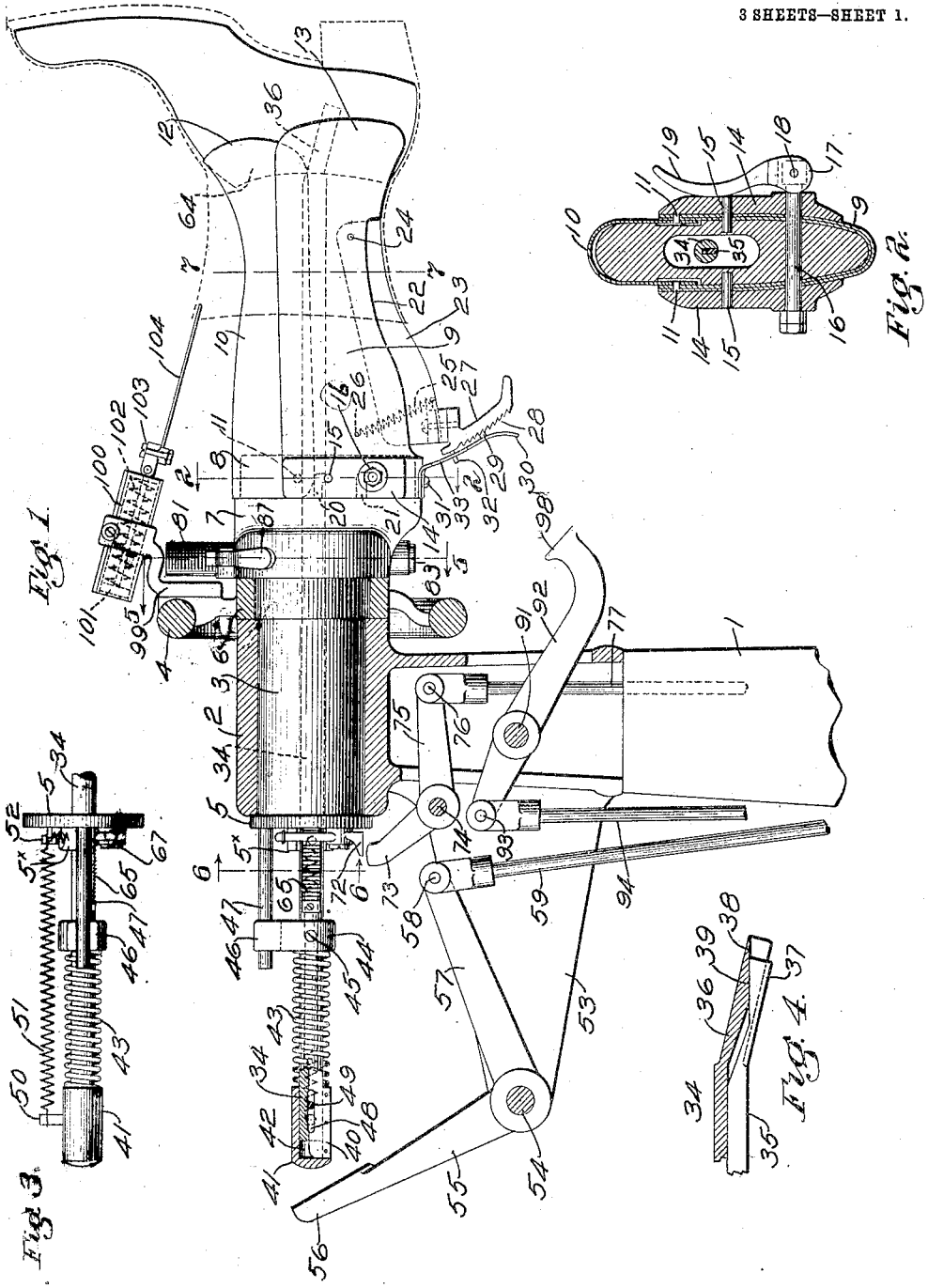

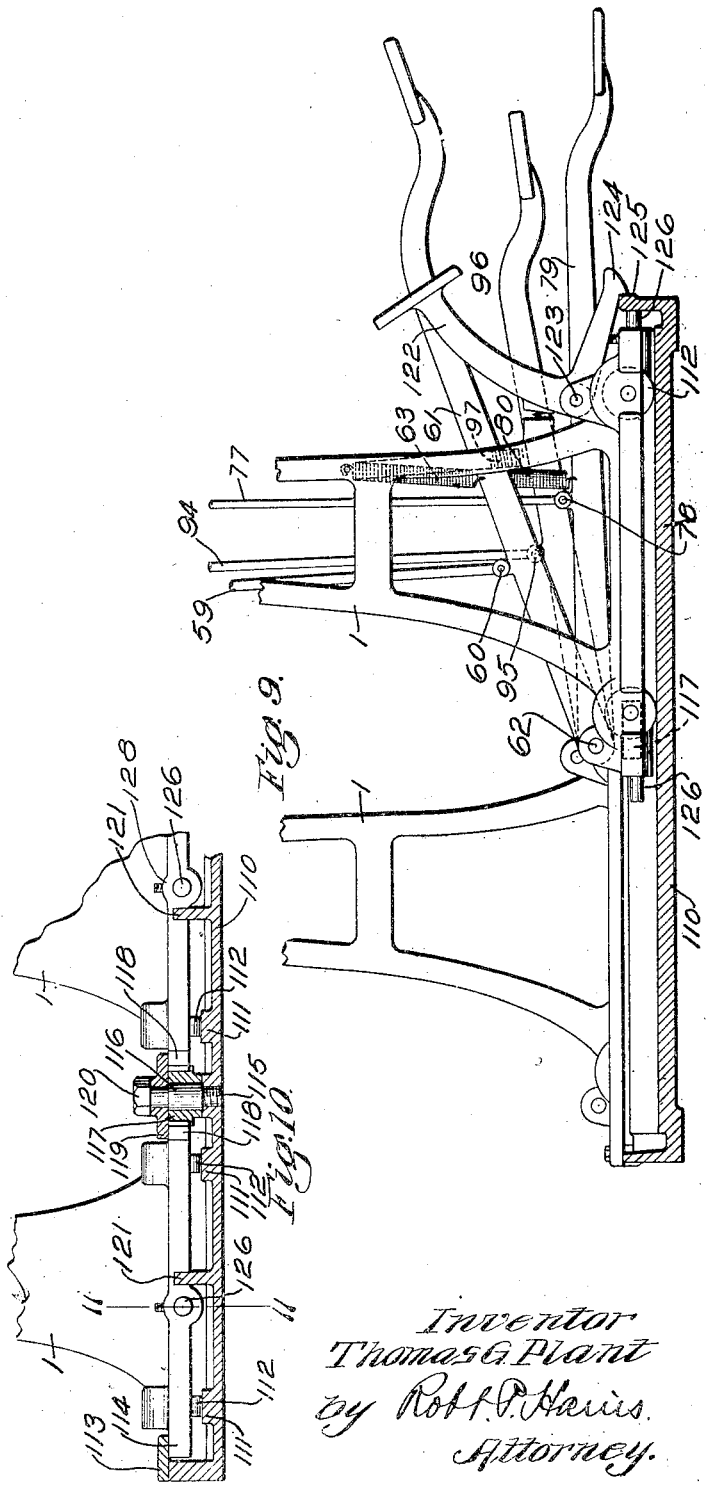

UNITED STATES PATENT OFFICE.

THOMAS G. PLANT, OF BOSTON, MASSACHUSETTS.

IRONING AND DRESSING JACK FOR BOOTS AND SHOES.

958,287.

Specification of Letters Patent.   Patented May 17, 1910.

Application filed October 19, 1909. Serial No. 523,330.

*To all whom it may concern:*

Be it known that I, THOMAS G. PLANT, a citizen of the United States, and a resident of Boston, in the county of Suffolk and State of Massachusetts, have invented an Improvement in Ironing and Dressing Jacks for Boots and Shoes, of which the following description, in connection with the accompanying drawings, is a specification, like numerals on the drawings representing like parts.

The invention herein to be described relates to boot and shoe supports or jacks for holding boots and shoes during the ironing and dressing operations.

The aims and objects of the present invention are to provide a device of the general character mentioned which may be readily handled and operated, and wherein the boot or shoe upper may be presented in a smooth and proper condition for the finishing operation, all as will be clearly understood from the following description and accompanying drawings of one form of means for carrying the invention into practical effect, it being understood that the described and illustrated details of said means are susceptible of great variation within the true scope of the invention which is properly defined by the claims.

In the drawings:—Figure 1 is a side elevation of a shoe support or jack embodying features of the present invention, some of the parts being broken away and others shown in section to more clearly illustrate the concrete device; Fig. 2 is a transverse section on the line 2—2, Fig. 1; Fig. 3 is a detached detail view showing means for projecting the shoe supporting spindle; Fig. 4 is a detached sectional detail showing the expansible character of the end portion of the spindle; Fig. 5 is a section on the line 5—5, Fig. 1; Fig. 6 is a section on the line 6—6, Fig. 1, looking in the direction of the arrows; Fig. 7 is a section on the line 7—7, Fig. 1, to more particularly show the leg pieces; Fig. 8 is a detached detail of the upper stretcher; Fig. 9 is a sectional side elevation of the lower portion of the machine supporting base and trackways for sustaining twin machines working alternately; Fig. 10 is a front view of the base portion with the frame and gear connection between the two machines shown in section, the treadles and other parts being omitted for clearness; and Fig. 11 is a section on the line 11—11, Fig. 10, showing the spring actuated plunger.

The jack supporting frame may be of any desired character, and is herein represented as a column 1 having at its upper portion a bearing 2 for a barrel 3 which is rotatable in said bearing by means of a hand wheel 4 secured to said barrel. The barrel 3 is restrained from endwise movement in the bearing by any suitable means, as by the collars 5 and 6 which are secured to the barrel 3 at opposite ends of the bearing 2, Fig. 1.

The barrel 3 preferably projects a convenient distance to the right, Fig. 1, of the bearing 2 and has detachably connected thereto the leg plates between the outer ends of which the crown or cone of the last extends when the lasted shoe is held in proper position for the dressing or finishing operation. In the present form of the invention the barrel 3 is provided with a shouldered portion 7 beyond which is the projection 8, shown by dotted lines, Fig. 1, for receiving the inner end portions of the leg members.

The leg members may be variously formed but are herein shown as comprising a part 9 constituting the rear portion of the leg, and which may be known as the rear leg member, and a part 10, preferably connected to the rear leg member and movable with respect thereto, and which for identification may be termed the front leg member.

In the form of invention shown the front leg member is movably connected to the rear leg member by a pivotal joint, as 11, but other forms of connections may be substituted, the desire in this respect, regardless of the particular means of connecting the two leg members or holding them on the barrel 3, being that their free ends may be susceptible of some separation to permit the crown or cone of the last to be properly inclosed thereby and snugly embraced without abrupt lines of separation marking the edges of the leg members. Obviously the edges 12 and 13 of the leg members may be made thin and tapering so that in ironing the upper no line or crease will be formed to mark the edge portions of the leg members.

As an appropriate and convenient means for holding the leg members 9 and 10 to the barrel 3, the said barrel 3 at the projecting portion 8 thereof, Fig. 1, is provided with the side clamps 14, said side clamps being sustained in position with respect to the barrel 3 by means of the pins 15, one at each side of the barrel and the clamping bolt 16, the construction being such that the side clamps 14 may be moved toward and from the projection 8 of the barrel and held in position close thereto by means of a clamp 17, Fig. 2. This clamp 17 is preferably connected to the bolt 16 at 18 and has a cam or eccentric portion, which, when the clamp 17 is, by its handle 19, turned into the upper position, as indicated in Fig. 2, will draw the side clamps 14 toward the barrel and when the handle 19 is turned in the reverse direction will free the side clamps therefrom.

The rear leg member 9 at its left portion, Fig. 1, is provided with the recesses 20 and 21, constituting in connection with the pins 15 and bolt 16 bayonet joints, the construction being such that, when the side clamps 14 are freed by the clamp 17, the rear leg member 9 and perforce the front leg member 10 connected thereto may be readily disconnected from the barrel and others substituted, or adjustments of desirable character made. It will be obvious also that when the clamp 17 is turned into clamping position and the leg members are disposed, as indicated in Figs. 1 and 2, the side clamps 14 will hold said members firmly to the barrel 3 while permitting the front leg member to yield more or less either by reason of its pivotal connection at 11 with the rear leg member or by its inherent elasticity.

The rear leg member 9 is provided with a slot 22 at its lower or back portion to accommodate a leg expanding member 23, said leg expanding member being movable with respect to the rear leg member so that the dimensions of the leg portion of the jack may be properly adjusted to suit the size of the upper being treated. As one means of thus movably connecting the leg expanding member 23 to the rear leg member 9, the former is conveniently pivoted to the rear leg member at 24, said leg expanding member being extended outwardly and forwardly, as indicated in Fig. 1, to substantially fill the opening made in the rear leg member. At its upper portion the leg expanding member 23 has connected thereto a spring 25, one end of which, 26, is also connected to the rear leg member or other suitable part, the construction being such that the spring 25 normally acts to withdraw the leg expanding member into the recess of the rear leg member 9, as will be clearly apparent from Fig. 1.

Suitable means are provided to hold the leg expanding member in its expanded condition with respect to the rear leg member when adjusted to fit the size of the upper being treated, and as one form of such means, the leg expanding member 23 is provided with an arm 27 having a series of teeth 28 adapted to be engaged by a tooth 29 carried by a spring 30 which is secured, as at 31, to the barrel 3 or rear leg member, the construction being such that when the leg expanding member is moved outwardly the desired distance about its pivotal connection 24 with the rear leg member, it will be locked and held in such position against the tension of the spring 25. In order to prevent undue movement of the leg expanding member 23 about its pivotal joint 24, the arm 27 has projecting therefrom a pin 32 which extends into a slot 33 in the spring 30, as will be clearly apparent from Fig. 1.

Extending longitudinally through the barrel 3 and leg members is the last supporting spindle 34, see Figs. 1, 2 and 3, on which the lasted shoe is sustained during the ironing or finishing operations. The last supporting spindle 34 is preferably provided at its last engaging end with means for locking the last to itself, such means preferably consisting of an expanding end portion or lock adapted to engage the last pin socket.

As one appropriate and convenient means for forming the expanding end or locking portion of the last supporting spindle, the latter is provided with a longitudinal groove throughout its length in which slides an end expander 35, and the last supporting spindle 34 is preferably provided with an inclined end portion 36, Figs. 1 and 4, also appropriately grooved to receive the inclined portion 37 connected to the end expander 35. The inclined end 36 of the last supporting spindle may also have the inclined shoulder 38 adapted to engage with the inclined or wedging surface 39 of the end 37 of the expander, the construction being such that upon movement of the end expander 35 to the right, Fig. 4, the end 37 will move forwardly and into the inclined slot of the end 36 of the last supporting spindle, thus contracting the expanding end of said last supporting spindle; and, conversely, the movement of the end expander 35 to the left, Fig. 4, the end 37 thereof will move outward from the slot in the end 36 of the last supporting spindle to appropriately fill the last pin socket with which it is engaged and lock the last to the spindle, the inclined surfaces 38 and 39, at such times, continuing to bear upon each other and give support and firm holding relation between the end 36 of the spindle and the end 37 of the end expander.

As hereinbefore noted, the end expander 35 extends throughout the length of the last supporting spindle and at its end portion is provided with a guide piece 40, Fig. 1, to which is secured the cap 41 having a socket 42 into which the end of the last supporting spindle 34 projects. Surrounding the last supporting spindle 34, at its left portion, Fig. 1, is a spring 43, one end of which bears against the cap piece 41 and the other end of which bears against a collar 44 secured by a pin 45 to the last supporting spindle 34, said collar 44 having a projecting portion 43 to embrace and slide upon a guide rod 47 projecting from the barrel 3, all as clearly indicated in Figs. 1 and 3. The end portion of the last supporting spindle 34 adjacent the cap piece 41 is provided with a slot 48 into which extends a pin 49 secured to the end expander 35, the construction being such that while the spring 43 acting upon the cap 41 will move the end expander 35 to the left, Fig. 1, and normally expand the end of the last supporting spindle, the slot and pin 48 and 49 respectively will prevent undue relative movement of these parts when no last is supported on the last supporting spindle.

Projecting from the cap piece 41 is a pin 50 having connected thereto one end of a light spring 51, the other end of which is connected at 52 to a pin projecting from the collar 5 of the barrel 3, said light spring 51 normally acting to move the last supporting spindle and its end expander 35 to the right, Fig. 1, while the spring 43 acts normally and automatically to maintain the end of the last supporting spindle expanded.

From the construction thus far described it will be apparent that the last supporting spindle and its end expander 35 will, under the action of the light spring 51, be normally held projecting to the right, Fig. 1, with the end of the last supporting spindle in last receiving position, and the end portion of the last supporting spindle will, through the end expander 35 and spring 43, be maintained expanded.

Extending from the column 1 is a bracket 53, Fig. 1, having pivotally connected thereto at 54 a lever, one arm 55 of which has an end portion 56 adapted to contact with the end of the cap piece 41, and the other arm 57 of which is connected at 58 to a treadle rod 59, said rod 59 being extended downward and connected at 60 to a treadle 61 pivoted at 62, the construction being such that upon depression of the treadle 61 against the normal action of its lifting spring 63, Fig. 9, the end 56 of the arm 55 will be moved into contact with the cap piece 41 and move the end expander relatively to the last supporting spindle to the right, to thereby contract the end of the last supporting spindle, in a manner as will be readily understood. Since, as hereinbefore noted, the last supporting spindle and end expander are held in projected position to the right, Fig. 1, it will be noted that depression of the treadle 61 will act upon the cap piece 41 when the collar 44 is held against a projecting portion 5* of the barrel 3 by the light spring 51, and that the said treadle action will compress the spring 43 sufficiently to move the end expander 35 lengthwise of the last supporting spindle to contract the end thereof into condition for the reception of the last.

The last 64, Fig. 1, having been placed upon the contracted end of the last supporting spindle, in the manner indicated, the operator smoothes the upper of the shoe and then, taking it by both hands, forces the shoe, the last, and perforce the last supporting spindle to the left, Fig. 1; he having previously removed his foot from the treadle 61. This movement of the shoe, the last, and the last supporting spindle causes the ends 12 and 13 of the front and rear leg members to pass over the crown or cone of the last and between it and the upper or lining, the parts assuming the position, as indicated in Fig. 1, it being understood that the leg expanding member 23 has been adjusted to suit the size of the leg portion of the shoe or boot being treated.

To maintain the last supporting spindle in the position last indicated, a suitable lock is provided, which in the present form of the invention comprises a series of teeth 65, Figs. 1, 3 and 6, formed on the last supporting spindle which are adapted to be engaged by a locking arm 66, Fig. 6, pivoted to the collar 5 at 67 and normally under the action of a spring 68, one end of which is connected at 69 to an arm 70 of said locking arm, and the other end of which is connected to a pin 71 projecting from the collar 5. Thus it will be seen that upon movement of the last supporting spindle to the left, Fig. 1, in the manner indicated, the locking arm 66 will automatically engage and lock the last supporting spindle to hold it and the lasted shoe in position, as indicated in Fig. 1, for the ironing or finishing operations.

In order to unlock the last supporting spindle and permit it to move to the right, Fig. 1, so that upon depression of the treadle 61 to contract the expanded end of the spindle, the finished shoe may be removed, the locking arm 66, Fig. 6, is provided with a toe 72 adapted to be engaged by a finger 73 of a lever pivoted at 74, Fig. 1, to the bracket 53, said lever having an arm 75 connected at 76 to a treadle rod 77, the lower end of which is connected at 78 to a treadle 79 pivoted at 62, the construction being such that upon depression of the treadle 79 in opposition to its spring 80, Fig. 9, the finger 73 will be thrown into engagement with and lift the toe 72 and unlock the last supporting spindle 34, whereupon said spindle, under the action of spring 51, will move longitudinally to the right, Fig. 1, and when in such position the operator may depress the treadle 61 to throw the end 56 of the arm 55 against the cap piece 41 to thus contract the expanded end of the spindle to permit removal of the lasted shoe and the substitution of another.

Since the ironing or finishing operation is to give to the shoe its final and finished appearance, it is essential that the upper be smooth and free from all wrinkles or other unsightly creases which might be formed if the ironing or finishing were conducted with either the upper or lining lacking in smoothness. It is particularly desirable that the upper at the rear of the shoe and about the counter be properly smoothed. As one means to this end the present invention contemplates not only a movement of the shoe inward or toward the leg members 9 and 10, but also a movement laterally with respect thereto, or, in the position of parts indicated in Fig. 1, movement in an upward direction as the shoe is brought to its final finishing or ironing position. As one means to this end the barrel 3, Figs. 1 and 5, is provided with an opening passing therethrough, into which extends a lifter 81 having a slotted portion 82 through which extend the last supporting spindle 34 and end expander 35. Obviously if the lifter 81 be moved in an upward direction, Fig. 5, the last supporting spindle will likewise be lifted, and perforce the last and shoe thereon will be given similar movement.

The lower portion of the lifter 81 is closed by a screw-threaded cap piece 83, Fig. 5, between which and a plunger 84 is disposed a spring 85, said plunger 84 being movable in the suitable recess of the lifter 81 to act upon the last supporting spindle 34 yieldingly. The upper portion of the lifter 81 is provided with locking teeth 86 which are adapted to engage with the end of a pawl 87 pivoted at 88 to suitable lugs projecting from the barrel 3, a spring 89 normally acting upon the pawl to throw it into locking engagement with the teeth, said pawl being provided with a tail piece 90 for throwing it out of such locking engagement when desired.

Pivoted to the machine column 1 at 91, Fig. 1, is a lifter arm 92 having connected at 93 a treadle rod 94, the lower end of which, Fig. 9, is pivoted at 95 to a treadle 96, said treadle 96 being normally held in raised position by means of a suitable spring 97. The end 98 of the lifter arm 92 is adapted to contact with the lower end of the lifter 81 and raise the same when the treadle 96 is depressed, as will be evident from Figs. 1 and 9, and when the lifter has been properly raised it will be held in such position by means of the ratchet teeth and pawl in a manner hereinbefore pointed out.

From the construction described it will be apparent that after the lasted shoe has been placed upon the last supporting spindle 34 and the end of said spindle has been expanded by its expanding spring 43, the operator may move the shoe to the left, Fig. 1, by engaging the upper of the shoe, and as he thus moves it the ends 12 and 13 of the leg members will pass between the upper and the crown or cone of the last. When in this position the treadle 96 may be depressed so that the last supporting spindle with the shoe and last carried thereby and locked thereto may be raised a desired amount to insure the smooth contact of the rear portion of the upper and counter about the rear leg portion, as will be clearly apparent.

If desired an upper stretcher may be employed in connection with the jack, as indicated in Figs. 1 and 8, such stretcher being preferably mounted on a bracket 99 and comprising a cylinder 100 in which moves a piston 101, Fig. 1, under the action of a spring 102, said piston having connected thereto a head 103 to which the fingers 104 are attached, as clearly apparent from Figs. 1 and 8.

The fingers 104 having been connected to the upper by engagement with the eyelets, it may be, will be moved by the spring 102 to stretch the upper in diagonal direction, as indicated in Fig. 1. In order that the cylinder 100 may be properly adjusted in its bearings 105, Fig. 8, it is provided with a series of ratchet teeth 106, Fig. 8, preferably formed on a bar secured by screws 107 to said cylinder, said teeth being adapted for engagement with a pin 108 and held in such engagement by a yielding plunger 109, as will be clearly apparent from Fig. 8.

In the construction hereinbefore described attention has been directed to a single shoe supporting means or jack but the present invention, among other characteristics, contemplates the employment of two machines conjointly to the end that while the operator is ironing or dressing one shoe supported by one of the jacks, a shoe supported by the other jack may be drying. As one form of means for carrying this feature of the invention into practical effect there is provided, Figs. 9 and 10, a bed plate or casting 110 having suitable tracks or ways 111 for rollers 112 carried by the respective standards 1 of the jacks, the construction being such that each of the standards may move back and forth alternately, as indicated in Fig. 9, on said bed plate 110.

In order that the standards and perforce the jacks carried thereby may be properly retained on the bed plate, the latter is provided at each side with an overhang 113, Fig. 10, which overlies and may engage the ends of cross pieces 114, one carried by each of the supporting columns 1. Midway between the supporting columns 1 is a stud 115, Fig. 10, projecting upward from the bed plate and having mounted on its cylindrical portion 116 a gear wheel 117, the teeth of which engage corresponding teeth in rack bars 118, one secured to and extending from front to rear of each of the columns 1, as indicated in Figs. 9 and 10. Above the gear wheel 117 the stud 115 carries a flange plate 119, said plate being held in position by means of the nut 120 and bearing upon the upper portion of the rack bars 118 secured one to each of the columns 1.

From the construction thus far described it will be apparent that upon movement of one of the columns 1 toward or from the rear of the bed plate, the other column will be moved in a reverse direction, such movement being in unison and of equal amounts, owing to the gear and rack bar connections herein described.

In order that the movement of the columns 1 may be made with ease and in direct paths, the bed plate 110 is provided with the upwardly projecting guide pieces 121, preferably one for each of the columns 1, said guide pieces extending from front to rear of the bed plate and engaging guide recesses in the bottom portions of the columns, as indicated in Fig. 10.

When either of the shoe supporting jacks or columns is in its forward or front position it is desirable to lock it and thus prevent accidental movement away from the hands of the operator. One means to this end comprises a treadle 122, Fig. 9, pivoted at 123 to each of the columns 1 near the bottom portion thereof, each treadle having connected thereto a catch 124 adapted to engage and interlock with a shoulder 125 formed on the bed plate 110 at the front portion thereof, the construction being such that upon placing the foot upon the treadle 122 and giving it a backward push, the catch 124 will be first thrown from engagement with its coacting part and then the machine column will be moved rearwardly while the other associated machine column will, by the means hereinbefore described, be moved to the front. This alternate front and rearward movement of the columns 1 is preferably, though not necessarily, further controlled by means of plungers 126, Fig. 11, one of said plungers being secured to the front and one to the rear of the base portion of each column 1 and adapted to contact with the end flange portions of the bed plate. These plungers 126 are contained in suitable sockets 127 formed in the lugs 128 of each column, and their inner ends rest upon suitable cushions, as the springs 129, the other end of said springs resting upon a screw-threaded block 130. In order to limit the amplitude of movement of the plungers 126 said plungers may be provided with an elongated slot 131, Fig. 11, into which projects the end of a screw stop 132. From this construction it will be apparent that when the operator presses back the treadle 122 to disengage the catch 124 and change the positions of the machine columns, the plungers 126 under the action of the springs 129 will assist in starting and controlling the movement of the columns, and when the columns arrive at front or rear position these plungers will yieldingly arrest movement thereof.

Obviously various changes may be made in the details and general arrangement of the parts hereinbefore described as one convenient form or embodiment of the invention without departing from the true scope thereof, which is properly announced by the claims.

What is claimed is:

1. An ironing and dressing jack having a leg portion, a last supporting spindle having an end portion to engage and interlock with the last pin socket of a last, means permitting movement of the last supporting spindle longitudinally to move a last carried by said spindle into position with respect to the leg portion, and means to move the last supporting spindle laterally with respect to the leg portion.

2. An ironing and dressing jack having a leg portion, a last supporting spindle having an end portion to engage the pin socket of a last, means permitting movement of the spindle longitudinally of the leg portion by pressure upon the shoe carried thereby, and means to move the last supporting spindle laterally of the leg portion.

3. An ironing and dressing jack having a leg portion, a last supporting spindle having an end portion to engage the pin socket of a last, means permitting movement of the spindle longitudinally of the leg portion by pressure upon the shoe carried thereby, and means acting yieldingly to move the last supporting the spindle in a direction toward the front of the leg portion.

4. In a dressing or finishing jack, the combination of a leg portion, a last supporting spindle movable longitudinally of said leg portion and having an end to engage the pin socket of a last, and means to move the last supporting spindle in a direction toward and from the front of the leg portion.

5. In a dressing and finishing jack, the combination of a leg portion comprising a front leg member and a rear leg member, a last supporting spindle having an end portion to engage the pin socket of a last, and means for moving the last supporting spindle in a direction toward the front leg member.

6. In a dressing and finishing jack, the combination of a leg portion comprising a front leg member and a rear leg member, and a last supporting spindle having an end portion to engage the pin socket of a last, one of said leg members having a leg expanding member movable with respect thereto into contact with the upper of a shoe mounted on the last supporting spindle.

7. In a dressing and finishing jack, the combination of a leg portion comprising a front leg member and a rear leg member, a last supporting spindle having an end portion to engage the pin socket of a last, one of said leg members having a leg expanding member movable with respect thereto into contact with the upper of a shoe mounted on the last supporting spindle, and a lock for holding said leg expanding member in position.

8. An ironing and dressing jack having a leg portion, a last supporting spindle having an end portion to engage and hold the last, means permitting relative longitudinal movement of the last supporting spindle and leg portion to position a last carried by said spindle, and means to move the last supporting spindle and last toward the front of the leg.

9. An ironing and dressing jack having a rear leg member, a front leg member, means for supporting said members, a leg expanding member movable with respect to the rear leg member into contact with the upper of a shoe embracing said members, and a lock, comprising an arm 27 having locking teeth and extending from the expanding member and a catch to engage said teeth, for holding the leg expanding member in expanding position.

10. An ironing and dressing jack having a rear leg member, a front leg member, means for supporting said members, a leg expanding member movable with respect to the rear leg member into contact with the upper of a shoe embracing said members, a locking arm and catch, one carried by the leg and the other by the expanding member for holding the leg expanding member in expanding position, and means for limiting the movement of the leg expanding member.

11. An ironing and dressing jack having a rear leg member and a front leg member movable with relation to the rear leg member, means for clamping the leg members in position, and a leg expanding member movable with relation to the rear leg member into contact with the upper portion of a shoe embracing said leg members.

12. In an ironing and dressing jack, the combination of a last supporting spindle having an end portion to engage the pin socket of a last, a front leg portion and a rear leg portion, the free edges of which are adapted to engage about a last on said spindle, means permitting relative longitudinal movement of the spindle and leg members to position the top or crown of a last between the ends of said leg members, and a leg expanding member movable with relation to the rear leg member into contact with the upper of a shoe sustained by said last supporting spindle.

13. In an ironing and dressing jack, the combination of a barrel having a leg sustaining portion, front and rear leg members adapted to engage said leg sustaining portion, and a clamp for detachably clamping the leg members to the barrel.

14. In an ironing and dressing jack, the combination of a barrel having a leg sustaining portion, pivotally connected front and rear leg members adapted to engage said leg sustaining portion, and a clamp for detachably clamping the leg members to the barrel.

15. In an ironing and finishing jack, the combination of a barrel having a leg sustaining portion, front and rear leg members extending from said barrel, means for securing the rear leg member to the barrel, and connections between said leg members permitting the front leg member to move relatively to the rear leg member.

16. An ironing and finishing jack having relatively movable front and rear leg members, a last supporting spindle extending longitudinally of said leg members and having an end to engage the socket of a last, and means for moving the last supporting spindle in a direction toward the front leg member.

17. An ironing and dressing jack having front and rear leg members adapted to embrace the cone or crown of a last, a last supporting spindle having an end to engage the pin socket of a last, means permitting relative longitudinal movement of the spindle and leg members to position the last for the ironing operation, and means for moving the spindle in a direction toward the front leg member.

18. An ironing and dressing jack having front and rear leg members adapted to embrace the cone or crown of a last, a last supporting spindle having an end to engage the pin socket of a last, means permitting relative longitudinal movement of the spindle and leg members to position the last for the ironing operation, means for moving the spindle in a direction toward the front leg member, and means for locking the spindle in position.

19. An ironing and dressing jack having a barrel, leg members extending from said barrel and adapted to receive the top or crown of a last between their free ends, a last supporting spindle having an end to engage and hold a last, means permitting relative longitudinal movement of the last supporting spindle and leg members to position a last between the free ends of said leg members, and means for detachably connecting the leg members to said barrel.

20. An ironing and dressing jack having a barrel, leg members extending from said barrel and adapted to receive the top or crown of a last between their free ends, and means for detachably connecting the leg members to said barrel, one of said leg members having a leg enlarging portion which is removable with it.

21. An ironing and dressing jack comprising a barrel having leg members projecting therefrom, a last supporting spindle extending longitudinally of said members, and treadle operated means for moving said spindle toward one of said members.

22. An ironing and dressing jack comprising a barrel having leg members projecting therefrom, a last supporting spindle extending longitudinally of said members, treadle operated means for moving said spindle toward one of said members, and a lock for holding the spindle in position.

23. An ironing and dressing jack comprising a barrel having leg members projecting therefrom, a last supporting spindle extending longitudinally of said members, treadle operated means for moving said spindle toward one of said members, a lock for holding the spindle in position, and a trip for said lock.

24. An ironing and dressing jack having leg members to embrace the cone or crown of a last between them, a last supporting spindle having an end portion to engage the pin socket of a last, means permitting the last supporting spindle to be moved longitudinally by pressure against the last carrying end thereof, and means to relatively move the spindle and leg members in a direction from rear to front of the leg members.

25. In an ironing and dressing machine, the combination of a barrel having leg members projecting therefrom, a last supporting spindle to engage and support a last and movable longitudinally of the leg members to position the last between said members, and means including a lifter arm to lift the spindle in the space between the leg members.

26. In an ironing and dressing machine, the combination of a barrel, a last supporting spindle having an end to engage the pin socket of a last, an end expander, inclined contacting portions between the end of the expander and the end of the last supporting spindle, means for moving the expander relative to the supporting spindle, and means permitting longitudinal movement of the spindle and expander as the last is placed in ironing position.

27. An ironing and dressing jack having a leg portion, a last supporting spindle having an expansible end to engage the pin socket of a last, a spring 51 to normally hold the last supporting spindle in last receiving position, means acting to normally expand the end of the spindle, and means to contract the expanded end of the spindle when in last receiving position.

28. An ironing and dressing jack having a barrel portion, and front and rear leg members adapted to receive between their outer ends the top or crown of a last, one of said leg members being detachably connected to the barrel portion, and the second leg member being pivotally connected to swing toward and from the other leg member.

29. An ironing and dressing jack having a barrel portion, front and rear leg members adapted to receive between their outer ends the top or crown of a last, one of said leg members being detachably connected to the barrel portion, and the second leg member being pivotally connected to swing toward and from the other leg member, and a clamp for holding the detachable leg member in place.

30. An ironing and dressing jack comprising a barrel having leg members adapted to receive between their outer ends the top or crown of a last, a last supporting spindle extending longitudinally of said leg members and having an end portion to engage and hold a last, and means for moving said spindle and last toward one of the said leg members.

31. An ironing and dressing jack comprising front and rear leg members having overlapping side portions and continuous front and rear portions, a last supporting spindle having an end portion to engage and hold a last, and means permitting relative longitudinal movement of the leg members and last supporting spindle to position a last between the end portions of said leg members.

32. An ironing and dressing jack comprising front and rear leg members having overlapping side portions and continuous front and rear portions, a last supporting spindle having an end portion to engage and hold a last, means permitting relative longitudinal movement of the leg members and last supporting spindle to position a last between the end portions of said leg members, and means for moving the spindle toward the front leg member.

33. An ironing and dressing jack comprising leg members adapted to receive the crown or top of a last between them, a last supporting spindle having a normally expanded end portion, means to contract the end portion to engage a last, means permitting relative longitudinal movement of the last supporting spindle and leg members to position a last between the ends of the leg members, a lock for holding the spindle in retracted position, and means for moving the last supporting spindle toward one of the leg members.

34. An ironing and dressing jack having leg members to receive between their outer ends the top or crown of a last, a last supporting spindle having an end portion, an expander having an end portion, said end portions of the spindle and expander having coacting bearing surfaces 38, 39, means for relatively moving the end portions of the spindle and expander, and means permitting the spindle and expander to move longitudinally together to position a last between the ends of the leg members.

In testimony whereof, I have signed my name to this specification, in the presence of two subscribing witnesses.

THOMAS G. PLANT.

Witnesses:
ALFRED F. HANDLEY,
FRANCIS H. ROWSOM.